Jan. 22, 1957  L. R. GRAVES  2,778,448
RESIN TRAP
Filed April 1, 1955

INVENTOR:
Loinel R. Graves
By (signature)
His Patent Attorney

United States Patent Office 2,778,448
Patented Jan. 22, 1957

2,778,448

RESIN TRAP

Loinel R. Graves, Long Beach, Calif., assignor to Northrop Aircraft, Inc., Hawthorne, Calif., a corporation of California Application April 1, 1955, Serial No. 498,571

1 Claim. (Cl. 183—43)

This invention has to do with containers and more particularly with containers for resin materials and the like.

Many resin materials and compounds are used for fabricating structures under vacuum conditions and as the knowledge of such materials is broadened the use in the aforementioned conditions is extended. However, certain physical characteristics of the materials themselves reduce the application thereof. For instance, the resins are drawn off the structural layup fabricating conditions due to the vacuum being applied thereto and are trapped or retained in suitable receptacles or containers. Certain applicable resins set up, solidify, or congeal in the containers rapidly, and periodically the containers must be disassembled and cleaned. Further, the resins are occasionally drawn into the conduit through which vacuum is applied to the layup. When this occurs the conduit, usually made of some expendable material, must be removed through arduous time consuming operations from the container and vacuum pump. Coupled with this fact is that under normal conditions the various conduits collect residual resin material therein and must again, through laborious disassembling methods, be removed from the various structures and related elements.

Therefore, the principal object of this invention is to provide a resin trap that has quick acting structural features that enable certain changes to be made in a minimum amount of time such as changing conduits and disposing of trapped resin.

Another object of this invention is to provide a resin trap that has no moving parts, is simple in construction and is economical to manufacture, fabricate and maintain.

Figure 1:
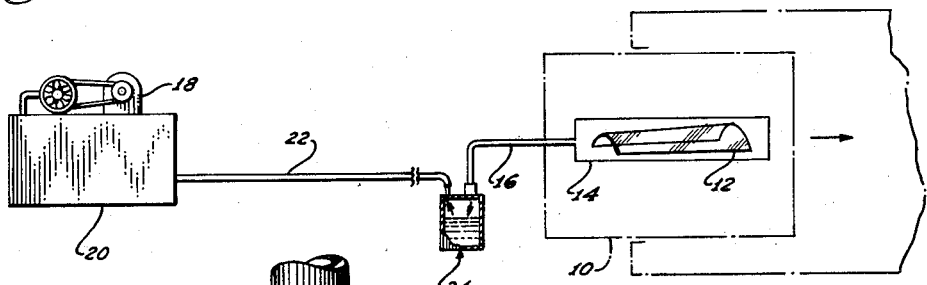
Figure 1 is a fragmentary, schematic view illustrating the resin trap as it is applied in a vacuum system.

Referring to the various figures for a more detailed description of the present invention, 10 designates a table, board, panel or the like upon which a layup or structure 12 is fabricated of resin materials. Over the layup or fabricated structure is placed a vacuum bag or equally applicable structure 14 and into which is inserted a vacuum hose or conduit 16. Applying vacuum to the vacuum bag 14 and structure 12 is a vacuum pump 18 mounted on a vacuum tank 20 and interconnected to the structure by a conduit 22.

Disposed between the fabricated structure 12 and vacuum tank 20 and interconnected to each through the medium of conduits 16 and 22 is a resin trap broadly designated 24.

The resin trap 24 is a container 26 having adjacent the open end thereof a plurality of projecting locking pins 28. Disposed in the container for receiving the resin entering through conduit 16 is a disposable bag or second container 30 made of paper, cardboard or other expendable material.

Located on the edge 32 of the container 26 is a resilient washer or gasket 34 made of rubber or other resilient material.

Rendering the container 26 closed and vacuum tight is a cover broadly designated 36. Integral with the cover 36 is a peripheral flange 38 having formed therein a plurality of arcuate locking notches 40 that receives the projecting pins 28 when the container is in the closed position.

The cover 36 has a pair of openings 42 and 44 therein one of which is defined by an elongated nipple or conduit receiving attachment 46 and one a resilient gasket 48 made of rubber or other equally applicable material, retained in an externally threaded projection or nipple 50 respectively.

Figure 2:
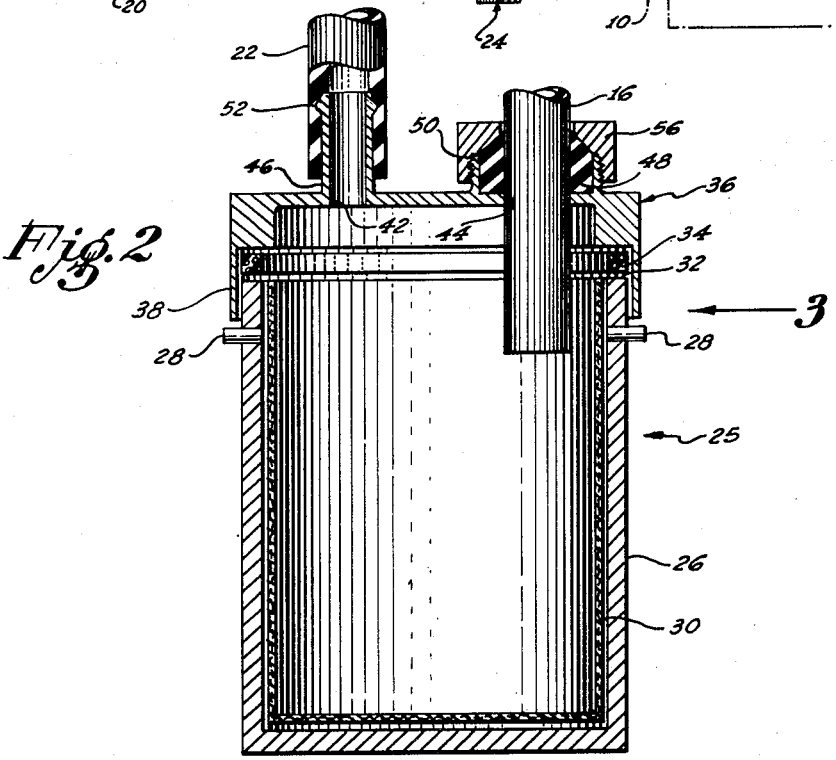
Figure 2 is an enlarged cross-sectional view illustrating and having embodied therein the present invention and showing the location and structure of the various parts.
Figure 3:
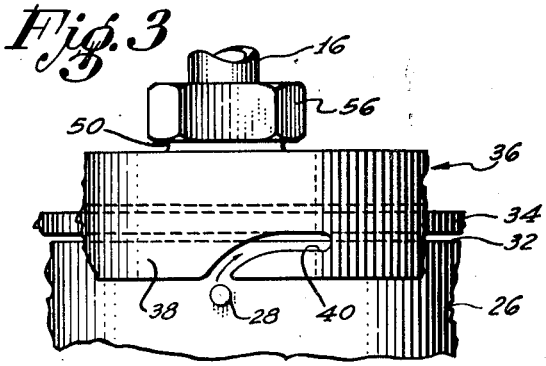
Figure 3 is a fragmentary view illustrating the quick acting lock mechanism taken on Figure 2 looking in the direction of the arrow identified by the numeral 3.

The nipple 46, adjacent its free end, has an enlargement 52 thereon over which the conduit 22 slides and is retained. Threaded onto nipple 50 for retaining gasket 48 in the proper position is a member 56. Conduit 16 projects through member 56 and gasket 48 and into the container 26 in the manner illustrated in Figure 2 of the drawings.

The operation of the device is as follows:

A disposable bag 30 is placed in the container 26 and the gasket 34 is placed on edge 32. The cover 36 then is applied to the container 26 and is rotated until the locking pins 28 engage the locking slots 40. Continued rotation urges the pins 28 further into the slots 40 and at the same time the cover 36 is pulled onto the container 26 until a vacuum seal is obtained. The conduits 16 and 22 may be either inserted into and onto their respective opening and nipple 42 and 46 before the cover 36 is applied to the container or after. With the conduits 16 and 22 attached to the resin trap, vacuum tank 20 and vacuum bag 14, the vacuum pump 18 may be started to establish vacuum on the layup or fabricated structure 12 to cause withdrawal of certain gases and impurities that are present and surround the fabricated structure 12. However, the vacuum drag results in drawing off certain excess resins as well and these resins are conveyed through conduit 16 to the resin trap 24 where they are collected in the bag 30 and prevented from being conveyed to the vacuum tank 20. When the bag 30 is full or it is desired to dispose of the trapped resin the pump 18 is stopped, the reversal of the procedure just described is followed and the bag 30 is removed and disposed of and another is inserted in its place.

In the event that one or both of the conduits 16 and 22 become clogged, excessively fouled or deteriorates it may be readily removed from the resin trap and another inserted in its place.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A resin trap comprising a container the interior of which is normally under negative pressure; disposable means within the container for receiving excess resin; a cover for said container; structure on said container for releasably locking said cover thereon; a pair of spaced apart nipples on said cover one of which is externally threaded; a resilient gasket inserted into said threaded nipple; an enlargement on the other of said nipples; a member threaded onto said threaded nipple; a conduit slidable onto and over said nipple having the enlargement thereon for applying negative pressure to said container; and a conduit slidable through said member, gasket and threaded nipple and into said container for carrying the excess resin thereinto.

References Cited in the file of this patent

UNITED STATES PATENTS

| | | |
|---|---|---|
| 1,398,230 | Hall | Nov. 29, 1921 |
| 1,918,006 | Walton | July 11, 1933 |
| 1,955,354 | Winslow | Apr. 17, 1934 |
| 2,025,946 | Wenner-Gren | Dec. 31, 1935 |